United States Patent Office 2,752,253
Patented June 26, 1956

2,752,253

PREPARATION OF CONCENTRATED PUREES

William F. Talburt, Berkeley, and Myron J. Powers, Lafayette, Calif., assignors to the United States of America as represented by the Secretary of Agriculture No Drawing. Application November 3, 1953,
Serial No. 390,099

1 Claim. (Cl. 99—204)

(Granted under Title 35, U. S. Code (1952), sec. 266)

A non-exclusive, irrevocable, royalty-free license in the invention herein described, for all government purposes, throughout the world, with the power to grant sublicenses for such purposes, is hereby granted to the Government of the United States of America.

This invention relates to and has as its prime object the provision of processes for preparing concentrated fruit purees. A particular object of the invention is the provision of methods for preparing concentrated fruit purees of natural color and flavor without the addition of sulphur dioxide or other sulphiting agent. These and other objects and advantages of the invention will be evident from the description herein.

To effect savings in shipping, storage, and container costs it has been suggested that fruit purees be preserved in concentrated form. The obvious way to prepare such a product involves maceration of fruit with or without cooking, followed by separation of skins, pits, etc. to prepare a single-strength puree. This puree is then subjected to evaporation to increase its solids content to the desired level and the resulting concentrated puree is preserved by canning or freezing. Such a procedure however does not yield a high quality product and many procedural difficulties are encountered. Some of the problems which are involved are explained as follows: Addition of a sulphiting agent (sulphur dioxide, sodium bisulphite, sodium sulphite, etc.) to the fruit is necessary to inhibit browning of the fruit during the maceration step particularly if no cooking is used. The addition of a sulphiting agent while it helps to initially preserve the color of the product adds other problems in that when the product is canned, the $SO_2$ is slowly reduced to $H_2S$ whereby the product develops bad odors and dark colors particularly in the area near the inner walls of the can. Further, the sulphur dioxide accelerates corrosion of cans. Another problem with the technique described above is that during evaporation of the puree, volatile flavoring components of the fruit are vaporized together with water so that the final product is deficient in flavor. A third point is that evaporation of purees is difficult because of their thick nature. Thus purees are difficult to pump, exhibit very poor heat transfer characteristics and tend to stick and burn on the hot surfaces of the evaporator. Under the best of circumstances only a limited degree of concentration can be achieved—in the case of several purees up to about 25% solids as a maximum.

The technique of this invention obviates all the above-described difficulties. Briefly described, this invention encompasses a procedure which involves first a dehydration of the fruit in its whole state with the skin essentially intact. This dehydration is carried out until the fruit reaches the desired solids content, usually a 50% reduction in weight. The dehydrated fruit is then, preferably while still hot, subjected to a pulping operation, that is, mashing and screening. The edible fruit material now in the form of a concentrated puree is forced through the screen while the pits and most of the skin remain on the screen and are discarded. The concentrated puree while still hot may be immediately canned or otherwise preserved for future use. In this process no sulphur dioxide or other sulphiting agent is added and none is necessary. Thus in the initial dehydration the fruit is in its whole state with its skin intact. As a result, the edible part of the fruit is protected from darkening by its skin. A certain limited amount of darkening will occur in the skin and at most in a thin layer of flesh immediately under the skin. This degree of darkening is immaterial particularly since most of the skin is removed in the subsequent screening operation. Thus although no sulphiting agent is employed, the concentrated puree product initially possesses a bright natural color and retains this color even after preservation and storage in cans since no sulphur dioxide is present to cause development of dark colorations and bad odors. Secondly, since the fruit is dehydrated while in its whole state there is much less loss of volatile flavoring components than where the puree is subjected to evaporation. The reasons for this phenomenon are not clearly understood but it is believed that since the particles of flavoring materials are dispersed throughout the fruit and in their natural positions, protected by cellular structure and arrangement, they are less readily vaporized than would be the case in a puree where the tissue is disorganized and the flavor particles are free in the liquid mass. Also, it may be that the intact skin is less permeable to the flavoring materials than to water vapor. A third advantage of the instant process is that the difficulties encountered with evaporation of a puree are entirely eliminated as this step is not employed.

Another advantage of the process of this invention is that the concentrated puree is produced in condition whereby it may be canned easily. This situation is explained as follows: During the partial dehydration, the fruit is subjected to heating and the partially dehydrated fruit produced in this step is hot. If this material is then subjected to immediate mashing and screening it will remain hot, dropping only a few degrees during this stage of the process. The hot concentrate can then be filled into cans which are sealed and given a short heat treatment just sufficient to sterilize the insides of the cans. Since the fruit concentrate remains hot from the time of mashing to the time of sealing the cans, it is essentially sterile and no heat processing is required for sterilization of the puree itself after insertion in the cans. This is an important feature of the invention as thereby heat damage to the puree is minimized. If it were not for the fact that the puree is produced in a hot condition and maintained hot, a separate heat processing would be required at some stage prior to or after canning to render the puree sterile. Such a heating of the puree could never be satisfactory because of the thick, viscous nature of the concentrated puree, its poor heat transfer properties and its tendency to burn onto heated surfaces. If for example cold concentrated puree were to be placed in cans and subjected to heat sufficient to sterilize the contents of the cans, the outer portions of the puree would be heat-damaged and burned to the sides of the cans whereas material in the centers of the cans would be insufficiently heated.

The process of this invention is described in greater detail below.

Fruit to be processed is first selected. The process is particularly adapted for use with small fruit as for example apricots, plums, prunes, cherries, grapes, nectarines, figs, etc. The fruit is washed to remove dust, insecticides, leaf debris, etc. The washing should be carried out in such a manner as to avoid breaking of the skin.

The whole, skin-intact fruit is then subjected to dehydration in apparatus of known type such as a cabinet, tunnel, or belt-type dehydrator. In any case, the equipment should be provided with means for subjecting a shallow layer of the fruit to a current of air or other gas heated to about from 125 to 200° F., preferably about 160–200° F. The dehydration under such conditions is continued until the fruit attains the desired degree of concentration, that is, a solids content from about 20% to about 50%.

The dehydrated fruit, preferably without any delay and while still hot, is then subjected to a pulping operation thus to reduce the fruit to a puree and to separate pits and skins. This operation may be carried out in a conventional paddle finisher or pulper which comprises a rotary cylindrical screen and rotataing paddles within the screen. The fruit is introduced into the screen where it is subjected to mashing by the rotating paddles which also force the pureed material through the screen. The pits, skins and other inedible material do not pass through the screen but are discharged at the end opposite the end into which the fruit is introduced. It is evident that other apparatus useful for the pulping and screening of fruit materials can be used instead of a paddle finisher.

The concentrated puree obtained in the foregoing step while still hot is filled in cans. The cans are immediately sealed and subjected to a heat treatment using a temperature and time of heating only sufficient to sterilize the cans. For example, a heat treatment at 212° F. for 2 to 5 minutes will be adequate in most cases. It is to be emphasized that the heat treatment is not of the intensive type required to sterilize the contents of a can in which case temperatures well above 212° F. and times up to 1 hour or more (depending on the size of can) are essential. In proceeding in accordance with this invention, the food material is maintained in a sterile condition because it is kept hot hence the heat treatment of the sealed cans is a mild treatment and is only nececssary to sterilize the cans themselves. Obviously, to maintain sterility, the process should be carried out under sanitary conditions and the partially dehydrated whole fruit should be subjected to the subsequent steps of pulping and filling into cans without any delay so that the material will remain hot, that is, about 150°–165° F. up to the time the cans are sealed.

If the concentrated puree is to be preserved by freezing rather than by canning, then the concentrated puree from the pulping operation is filled into cans or other suitable containers which are then subjected to freezing conditions and maintained in frozen storage.

The invention is illustrated by the following examples.

*Example I*

A lot of fresh Blenheim apricots was washed. The whole, skin-intact apricots were spaced on the shelves of a cabinet dehydrator where they were subjected to a current of air at 190° F. until their weight was halved due to loss of moisture. It was observed that there occurred some darkening of the skins but the flesh was essentially bright and of natural color.

The partially dehydrated apricots while still hot (about 160–165° F.) from the dehydration were immediately introduced into a paddle finisher to mash the fruit and remove skins and pits. The concentrated puree (30% solids) which passed through the screen while still hot (about 150–155° F.) was immediately filled into cans which were then sealed and given a short cook (212° F., 5 min.) in order to sterilize the insides of the cans.

Samples of the canned product were examined and it was observed that the product had a bright natural color and an excellent natural flavor. Samples of the canned product were opened after 6 months' storage and it was found that the products had retained their natural color and flavor. In addition, the insides of the cans were neither discolored nor corroded.

*Example II*

A lot of sour red cherries were washed. The whole, skin-intact cherries were spread on the shelves of a cabinet dehydrator where they were dehydrated, to the extent of a 50% weight reduction, in a current of air heated to 200° F. The partially dehydrated cherries were, while hot, subjected to mashing, screening, and canning as described in Example I. The canned puree (22% solids) was examined and found to have a bright natural color and an excellent natural taste and odor.

Having thus described our invention, we claim:

A method of preparing and preserving a concentrated fruit puree which comprises subjecting non-sulphited, whole, skin-intact fruit to partial dehydration with the application of heat, until its solids content is from about 20% to about 50%, pulping the hot, partially dehydrated fruit to produce a hot, nonsulphited, concentrated puree, and subjecting the puree to a preservation treatment.

References Cited in the file of this patent

UNITED STATES PATENTS

| | | |
|---|---|---|
| 1,374,160 | Fowler | Apr. 5, 1921 |
| 1,586,893 | Gay et al. | June 1, 1926 |
| 2,115,382 | Campbell et al. | Apr. 26, 1938 |
| 2,565,942 | Barsky et al. | Aug. 28, 1951 |